(12) United States Patent
Datena

(10) Patent No.: US 9,738,221 B1
(45) Date of Patent: Aug. 22, 2017

(54) AUDIBLE VEHICULAR WARNING SYSTEM

(71) Applicant: Joseph Datena, Island Park, NY (US)

(72) Inventor: Joseph Datena, Island Park, NY (US)

( * ) Notice: Subject to any disclaimer, the term of this patent is extended or adjusted under 35 U.S.C. 154(b) by 0 days.

(21) Appl. No.: 15/162,736

(22) Filed: May 24, 2016

(51) Int. Cl.
*B60Q 1/00* (2006.01)
*B60Q 9/00* (2006.01)

(52) U.S. Cl.
CPC .................................. *B60Q 9/008* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,840,852 A * | 10/1974 | Schwellenbach | .... | B60Q 11/005 340/458 |
| 4,843,367 A | 6/1989 | Saito | | |
| 5,117,217 A | 5/1992 | Nykerk | | |
| 5,521,580 A * | 5/1996 | Kaneko | ................. | B60K 28/02 180/272 |
| 5,719,552 A * | 2/1998 | Thompson | ............. | B60Q 1/305 200/184 |
| 6,615,121 B2 | 9/2003 | Li | ........................ | G01S 15/931 340/903 |
| 7,137,674 B2 | 11/2006 | Goebels | | |
| 7,164,350 B2 | 1/2007 | Ferrone | | |
| 8,537,030 B2 * | 9/2013 | Perkins | .................. | B60Q 1/506 340/425.5 |
| D737,713 S | 9/2015 | Deyaf | | |
| 9,120,447 B1 | 9/2015 | Moldestad | | |
| 2003/0122659 A1 | 7/2003 | Lam | | |
| 2003/0132607 A1 * | 7/2003 | Pan | .......................... | B60D 1/18 280/491.5 |
| 2004/0227646 A1 * | 11/2004 | Henry | ................. | B60R 25/1004 340/902 |
| 2010/0060439 A1 * | 3/2010 | Fitzgerald | ................ | B60Q 1/22 340/431 |
| 2011/0199199 A1 * | 8/2011 | Perkins | .................. | B60Q 1/506 340/435 |
| 2014/0306813 A1 | 10/2014 | Tabe | | |
| 2016/0121791 A1 * | 5/2016 | Shimizu | ................. | G08G 1/166 340/435 |

FOREIGN PATENT DOCUMENTS

EP 2402214 A1 1/2012

* cited by examiner

*Primary Examiner* — Travis Hunnings
(74) *Attorney, Agent, or Firm* — Kyle A. Fletcher, Esq.

(57) ABSTRACT

The audible vehicular warning system is a transportation safety device that is adapted for use with vehicles. The audible vehicular warning system is adapted for use as a collision avoidance device. The audible vehicular warning system monitors the visual signal signaling devices of the vehicle that indicate that: 1) the vehicle is capable of motion in the reverse direction; 2) the driver of the vehicle intends to turn left; and, 3) the driver of the vehicle intends to turn left. Should any of these conditions occur, the audible vehicular warning system generates an audible signal through a plurality of speakers to indicate when one of these three hazard conditions exist. The audible vehicular warning system comprises a logic module and a plurality of speakers.

12 Claims, 3 Drawing Sheets

AUDIBLE VEHICULAR WARNING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicle lighting and signaling, more specifically, an acoustic signal indicating a collision risk between vehicles or a vehicle and a pedestrian.

SUMMARY OF INVENTION

The audible vehicular warning system is a transportation safety device that is adapted for use with vehicles. The audible vehicular warning system is adapted for use as a collision avoidance device. The audible vehicular warning system monitors the visual signal signaling devices of the vehicle that indicate that: 1) the vehicle is capable of motion in the reverse direction; 2) the driver of the vehicle intends to turn left; and, 3) the driver of the vehicle intends to turn left. Should any of these conditions occur, the audible vehicular warning system generates an audible signal through a plurality of speakers to indicate when one of these three hazard conditions exist.

These together with additional objects, features and advantages of the audible vehicular warning system will be readily apparent to those of ordinary skill in the art upon reading the following detailed description of the presently preferred, but nonetheless illustrative, embodiments when taken in conjunction with the accompanying drawings.

In this respect, before explaining the current embodiments of the audible vehicular warning system in detail, it is to be understood that the audible vehicular warning system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the audible vehicular warning system.

It is therefore important that the claims be regarded as including such equivalent construction insofar as they do not depart from the spirit and scope of the audible vehicular warning system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
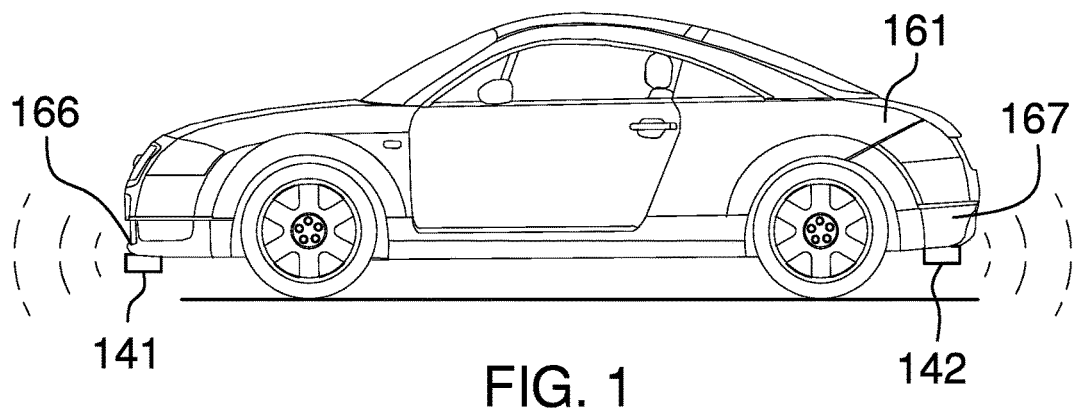
FIG. 1 is a side view of an embodiment of the disclosure.
Figure 2:
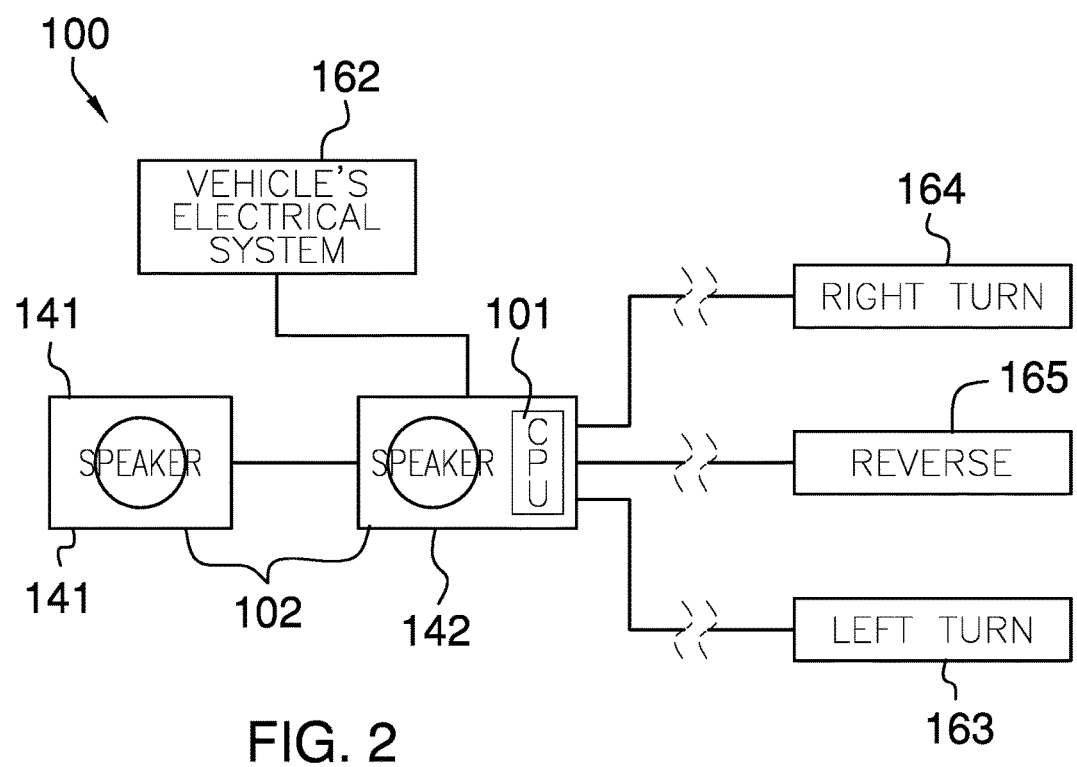
FIG. 2 is a block diagram of an embodiment of the disclosure.
Figure 3:
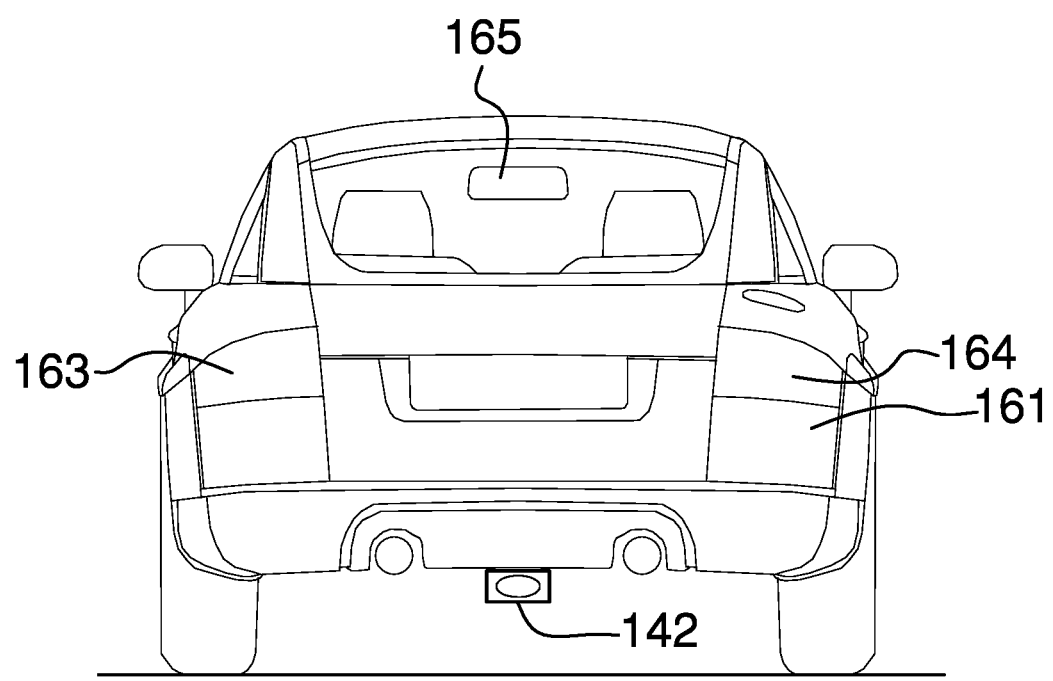
FIG. 3 is a rear view of an embodiment of the disclosure.
Figure 4:
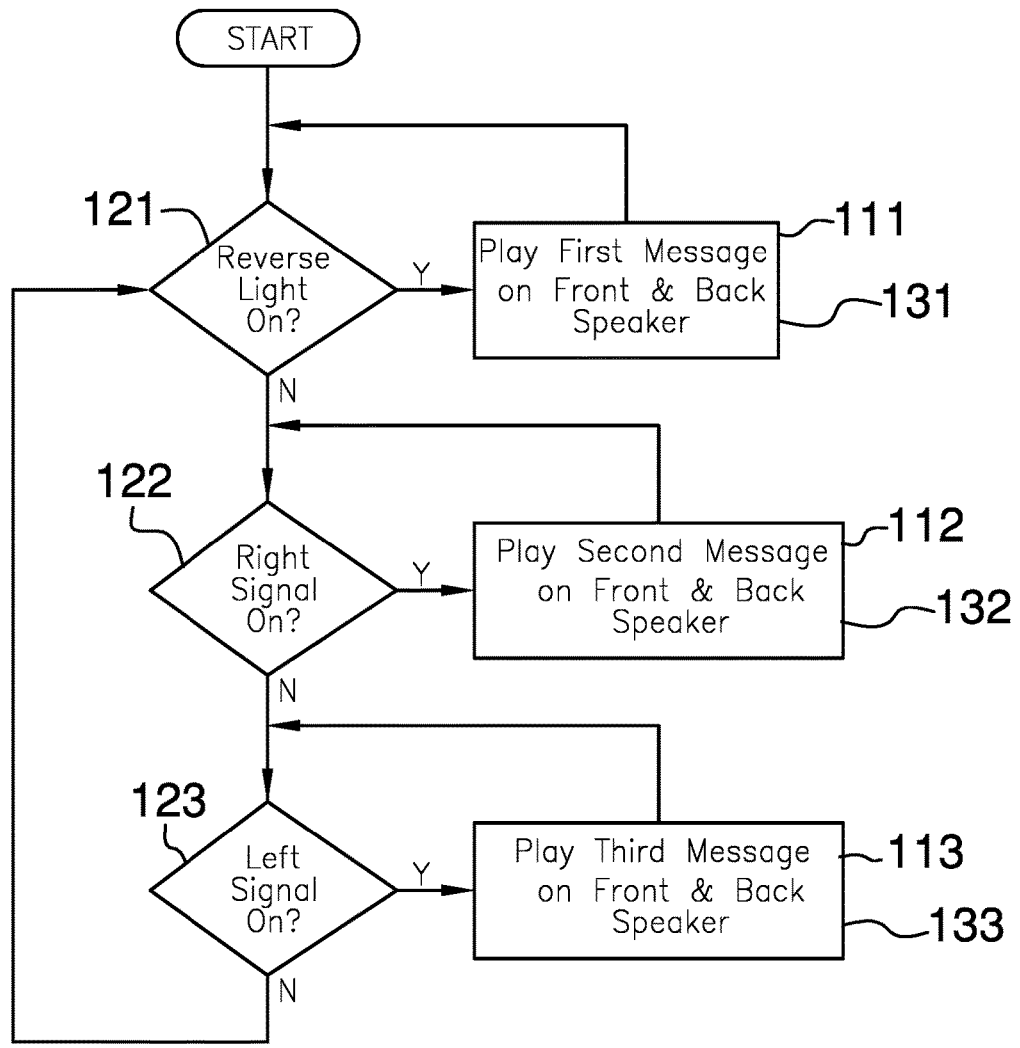
FIG. 4 is a flowchart of an embodiment of the disclosure.

Detailed reference will now be made to one or more potential embodiments of the disclosure, which are illustrated in FIGS. 1 through 4.

The audible vehicular warning system 100 (hereinafter invention) comprises a logic module 101 and a plurality of speakers 102. The invention 100 is a transportation safety device that is adapted for use with a vehicle 161. The invention 100 is adapted for use as a collision avoidance device. The invention 100 monitors the visual signal signaling devices of the vehicle 161 that indicate that: 1) the vehicle 161 is capable of motion in the reverse direction; 2) the driver of the vehicle 161 intends to turn right; and, 3) the driver of the vehicle 161 intends to turn left. Should any of these conditions occur, the invention 100 generates an audible signal through the plurality of speakers 102 to indicate when one of these three hazard conditions exist.

The operation of the invention 100 is described more fully in this paragraph. The logic module 101 is connected into the vehicle 161 electrical system 162. The logic module 101 draws its operating power from the vehicle 161 electrical system 162 and monitors the left turn signal light 163, the right turn signal light 164 and the reverse signal light 165 of the vehicle 161. As shown most clearly in FIG. 4, the logic module 101 makes a first decision 121 to determine whether the reverse signal light 165 is illuminated by measuring the voltage at the reverse signal light 165. If the reverse signal light 165 is illuminated, the logic module 101 takes a first action 131 by announcing a first message 111 through the plurality of speakers 102. The first message 111 is an audible signal that is intended to warn those near the vehicle 161 that the vehicle 161 is enabled to move in the reverse direction. While the first message 111 can be any sort of audible sound that acts as a stimulus to those around the vehicle 161, it is preferred that the first message 111 be a verbal announcement that specifically states that the vehicle 161 is enabled to move in the reverse direction.

In the first potential embodiment of the disclosure, the first message 111 is an audio file that is stored in the logic module 101 and that the logic module 101 converts into an audio signal as a part of the first action 131. Once the first message 111 has been announced, the logic module 101 loops back to the first decision 121. Should the logic module 101 determine that the reverse signal light 165 is not illuminated, the logic module 101 makes a second decision 122 to determine whether the right turn signal light 164 is illuminated by measuring the voltage at the right turn signal light 164. If the right turn signal light 164 is illuminated, the logic module 101 takes a second action 132 by announcing a second message 112 through the plurality of speakers 102. The second message 112 is an audible signal that is intended to warn those near the vehicle 161 that the driver of the vehicle 161 intends to turn right. While the second message 112 can be any sort of audible sound that acts as a stimulus to those around the vehicle 161, it is preferred that the second message 112 be a verbal announcement that specifically states that the driver of the vehicle 161 intends to turn right.

In the first potential embodiment of the disclosure, the second message 112 is an audio file that is stored in the logic module 101 and that the logic module 101 converts into an audio signal as a part of the second action 132. Once the second message 112 has been announced, the logic module 101 loops back to the second decision 122. Should the logic module 101 determine that the right turn signal light 164 is not illuminated, the logic module 101 makes a third decision 123 to determine whether the left turn signal light 163 is illuminated by measuring the voltage at the left turn signal light 163. If the left turn signal light 163 is illuminated, the logic module 101 takes a third action 133 by announcing a third message 113 through the plurality of speakers 102. The third message 113 is an audible signal that is intended to warn those near the vehicle 161 that the driver of the vehicle 161 intends to turn left. While the third message 113 can be any sort of audible sound that acts as a stimulus to those around the vehicle 161, it is preferred that the third message 113 be a verbal announcement that specifically states that the driver of the vehicle 161 intends to turn left.

In the first potential embodiment of the disclosure, the third message 113 is an audio file that is stored in the logic module 101 and that the logic module 101 converts into an audio signal as a part of the third action 133. Once the third message 113 has been announced, the logic module 101 loops back to the third decision 123. Should the logic module 101 determine that the left turn signal light 163 is not illuminated, the logic module 101 loops back to the first decision 121.

It shall be noted that the first message 111, the second message 112, and the third message 113 may be programmed into the logic module 101 so as to further characterize and tailor the message to the needs of an end user. Inputting the designated audio file into the logic module 101 may require a microphone (not depicted) or a USB drive with the pre-recorded message thereon. The USB drive would plug directly into the logic module 101. There is a plurality of different methods to program new messages into the logic module 101. Furthermore, the message may be in any language or involve the voice of a famous person.

The logic module 101 is a programmable device that is used to control and operate the device. Depending on the specific design and the selected components, the logic module 101 can be a separate component within the device or the functions of the logic module 101 can be incorporated into another component within the device. The logic module 101 is mounted within the vehicle 161 and is powered directly from the vehicle 161 electrical system 162.

Each of the plurality of speakers 102 is a readily and commercially available speaker that is mounted on the exterior of the vehicle 161. Each of the plurality of speakers 102 is selected to be a speaker designed for outdoor use. Each of the plurality of speakers 102 receives the audio signal generated by the logic module 101 and physically announces the audio signal such that the audio signal can be heard by those near the vehicle 161 when a hazard condition exists. For purposes of this disclosure, it is assumed that each of the plurality of speakers 102 comprises the power circuitry necessary to drive each of the each of the plurality of speakers 102 at an audible volume. This is strictly a choice that is made to maintain the clarity and the simplicity of this disclosure.

Those skilled in the electrical arts will recognize that the disclosure can be readily modified to relocate the power circuitry to the logic module 101 or added as a separate component without undue experimentation. The audio signal generated by the logic module 101 can be delivered to each of the plurality of speakers 102 either wirelessly or through the use of a cable connection to the logic module 101. The use of cables is preferred.

In a first potential embodiment of the disclosure, the logic module 101 is an Arduino based microcontroller with the associated shields. The plurality of speakers 102 further comprises a first speaker 141 and a second speaker 142. As shown most clearly in FIG. 1, the first speaker 141 is mounted under the front bumper 166 of the vehicle 161 and the second speaker 142 is mounted under the rear bumper 167 of the vehicle 161.

Methods to assemble and program devices as described in this disclosure using the Arduino based components are well known and documented in the electrical arts. The design of shield to drive speakers are also well known and documented in the electrical arts.

Once the invention 100 is installed a vehicle 161, the operation of the invention 100 is automatic.

The following definitions were used in this disclosure:

Audio File: As used in this disclosure, an audio file is a digital representation of a sound that is used to store a recording of the sound. Separate hardware is used to convert the digital representation of the sound into an audible sound.

Audio Source: As used in this disclosure, an audio source is a device that generates electrical signals that can be converted in to audible sounds by a speaker.

Cable: As used in this disclosure, a cable is a collection of insulated wires covered by a protective casing that is used for transmitting electricity or telecommunication signals.

Logic Module: As used in this disclosure, a logic module is an electrical device that is programmable and that accepts digital and analog inputs, processes the digital and analog inputs according to previously stored instruction and to provide the results of these instructions as digital or analog outputs.

Speaker: As used in this disclosure, a speaker is an electrical device that converts an electrical signal into an audible sound.

Vehicle: As used in this disclosure, a vehicle is a motorized device that is used transporting carrying passengers, goods, or equipment on a network of roads. The use of the term motorized means that the vehicle can move under power provided by an electric motor or an internal combustion engine.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A collision avoidance device comprising:
a logic module and a plurality of speakers;
wherein the plurality of speakers is connected to the logic module;
wherein the collision avoidance device is adapted for use with a vehicle;
wherein the collision avoidance device monitors a visual signal signaling device of the vehicle that indicates that the vehicle is capable of motion in the reverse direction;
wherein the collision avoidance device monitors a visual signal signaling device of the vehicle that indicates that the vehicle is turning right;
wherein the collision avoidance device monitors a visual signal signaling device of the vehicle that indicates that the vehicle intends is turning left;
wherein the collision avoidance device generates an audible signal through the plurality of speakers to indicate that a hazard condition exists;
wherein the visual signal signaling device of the vehicle that indicates that the vehicle is capable of motion in the reverse direction is referred to as a reverse signal light;
wherein the visual signal signaling device of the vehicle that indicates that the vehicle is turning right is referred to as a right turn signal light;
wherein the visual signal signaling device of the vehicle that indicates that the vehicle is turning left is referred to as a left turn signal light;
wherein the logic module is a programmable electronic device;
wherein the logic module is mounted within the vehicle;
wherein the logic module is powered directly from the vehicle;
wherein each of the plurality of speakers is mounted on the exterior of the vehicle;
wherein each of the plurality of speakers receives an audio signal generated by the logic module;
wherein each of the plurality of speakers physically announces the audio signal;
wherein the logic module is an Arduino based microcontroller;
wherein the logic module makes a first decision to determine whether the reverse signal light is illuminated;
wherein the logic module takes a first action by announcing a first message through the plurality of speakers;
wherein the logic module makes a second decision to determine whether the right turn signal light is illuminated;
wherein the logic module takes a second action by announcing a second message through the plurality of speakers;
wherein the logic module makes a third decision to determine whether the left turn signal light is illuminated;
wherein the logic module takes a third action by announcing a third message through the plurality of speakers.

2. The collision avoidance device according to claim 1 wherein the first speaker is mounted under a front bumper of the vehicle;
wherein the second speaker is mounted under a rear bumper of the vehicle.

3. The collision avoidance device according to claim 2 wherein each the audio signal generated by the logic module is delivered wirelessly to each of the plurality of speakers.

4. The collision avoidance device according to claim 2 wherein each the audio signal generated by the logic module is delivered through cables to each of the plurality of speakers.

5. The collision avoidance device according to claim 1 wherein the first message is a verbal announcement;
wherein the second message is a verbal announcement;
wherein the third message is a verbal announcement.

6. The collision avoidance device according to claim 5 wherein the logic module determines whether the reverse signal light is illuminated by measuring the voltage at the reverse signal light;
wherein the logic module determines whether the whether the right turn signal light is illuminated by measuring the voltage at the right turn signal light;
wherein the logic module determines whether the whether the left turn signal light is illuminated by measuring the voltage at the left turn signal light.

7. The collision avoidance device according to claim 6 wherein the first speaker is mounted under a front bumper of the vehicle;
wherein the second speaker is mounted under a rear bumper of the vehicle;
wherein each the audio signal generated by the logic module is delivered to each of the plurality of speakers using a method selected from the group consisting of a wireless method or a cabled connection.

8. A collision avoidance device comprising:
a logic module and a plurality of speakers;
wherein the plurality of speakers is connected to the logic module;
wherein the collision avoidance device is adapted for use with a vehicle;
wherein the collision avoidance device monitors a visual signal signaling device of the vehicle that indicates that the vehicle is capable of motion in the reverse direction;
wherein the collision avoidance device monitors a visual signal signaling device of the vehicle that indicates that the vehicle is turning right;
wherein the collision avoidance device monitors a visual signal signaling device of the vehicle that indicates that the vehicle intends is turning left;
wherein the collision avoidance device generates an audible signal through the plurality of speakers to indicate that a hazard condition exists;
wherein the visual signal signaling device of the vehicle that indicates that the vehicle is capable of motion in the reverse direction is referred to as a reverse signal light;

wherein the visual signal signaling device of the vehicle that indicates that the vehicle is turning right is referred to as a right turn signal light;

wherein the visual signal signaling device of the vehicle that indicates that the vehicle is turning left is referred to as a left turn signal light;

wherein the logic module is a programmable electronic device;

wherein the logic module makes a first decision to determine whether the reverse signal light is illuminated;

wherein the logic module takes a first action by announcing a first message through the plurality of speakers;

wherein the logic module makes a second decision to determine whether the right turn signal light is illuminated;

wherein the logic module takes a second action by announcing a second message through the plurality of speakers;

wherein the logic module makes a third decision to determine whether the left turn signal light is illuminated;

wherein the logic module takes a third action by announcing a third message through the plurality of speakers.

9. The collision avoidance device according to claim 8 wherein the first message is a verbal announcement;

wherein the second message is a verbal announcement;

wherein the third message is a verbal announcement.

10. The collision avoidance device according to claim 9 wherein the logic module determines whether the reverse signal light is illuminated by measuring the voltage at the reverse signal light;

wherein the logic module determines whether the whether the right turn signal light is illuminated by measuring the voltage at the right turn signal light;

wherein the logic module determines whether the whether the left turn signal light is illuminated by measuring the voltage at the left turn signal light.

11. The collision avoidance device according to claim 10 wherein the logic module is a programmable electronic device;

wherein the logic module is mounted within the vehicle;

wherein the logic module is powered directly from the vehicle;

wherein each of the plurality of speakers is mounted on the exterior of the vehicle;

wherein each of the plurality of speakers receives an audio signal generated by the logic module;

wherein each of the plurality of speakers physically announces the audio signal;

wherein the first speaker is mounted under a front bumper of the vehicle;

wherein the second speaker is mounted under a rear bumper of the vehicle;

wherein each the audio signal generated by the logic module is delivered to each of the plurality of speakers using a method selected from the group consisting of a wireless method or a cabled connection.

12. The collision avoidance device according to claim 11 wherein the logic module is an Arduino based microcontroller.

* * * * *